June 28, 1932.   R. W. KOHLER   1,865,376
PLANTER AND DISKER
Filed Feb. 14, 1927   2 Sheets-Sheet 1

R. W. Kohler,
INVENTOR
BY Victor J. Evans
ATTORNEY

WITNESS:

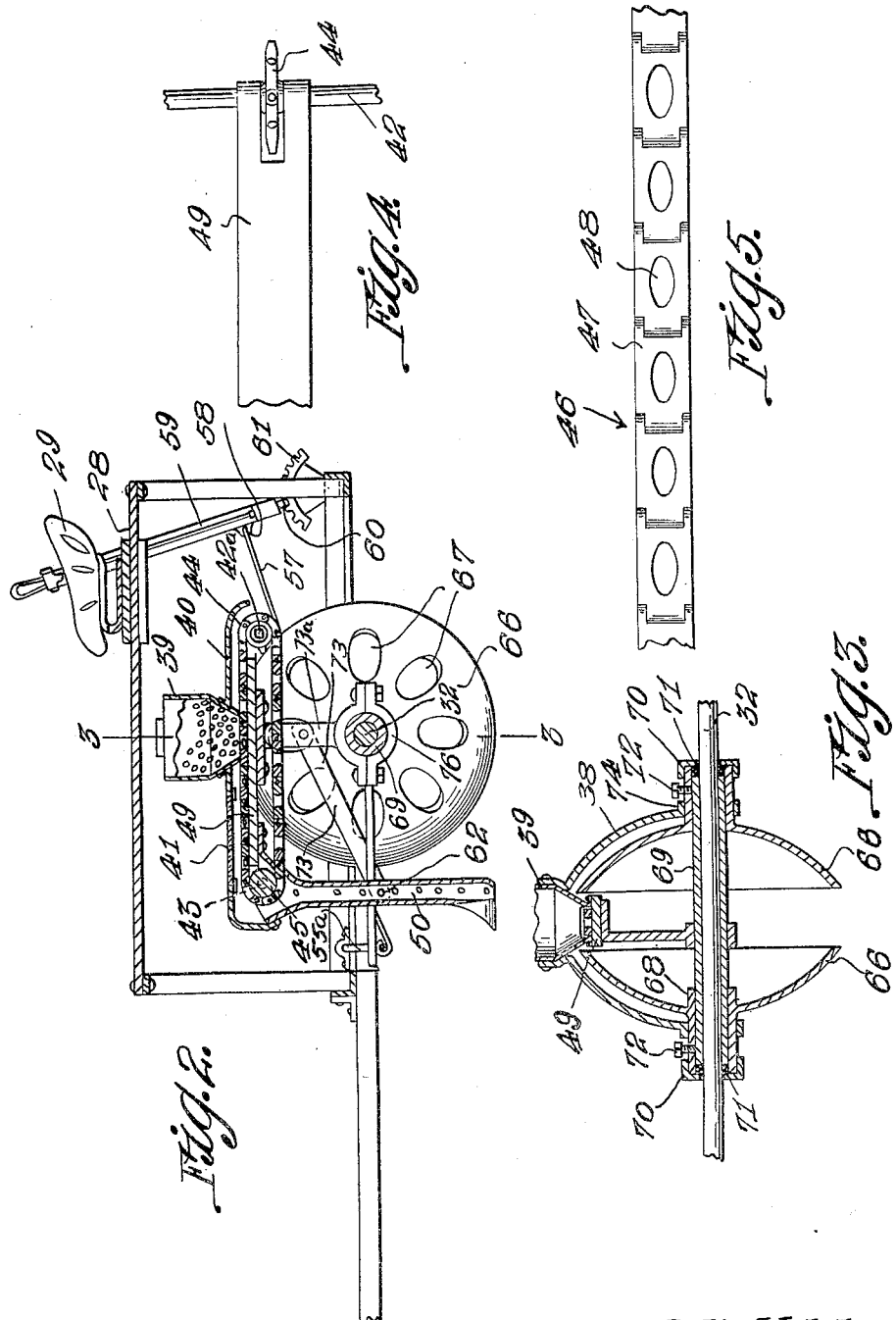

Patented June 28, 1932

1,865,376

UNITED STATES PATENT OFFICE

ROBERT W. KOHLER, OF TEKAMAH, NEBRASKA

PLANTER AND DISKER

Application filed February 14, 1927. Serial No. 168,145.

This invention relates to agricultural implements and has for its object the provision of a novel combined planter and disker.

It is well known that if the ground is left in the condition in which it is after treatment by listers, and the like, the rough and lumpy nature provides a vast number of crevices, permitting evaporation of the moisture in the soil. As a result grain planted does not sprout properly and a poor crop results. Furthermore, such drying out permits the soil to become too hard especially in the case of such soils as contain a large percentage of clay.

It is with the above facts in view that I have designed the present device which embodies disks so constructed and arranged as to break up the lumps and leave the soil in a comparatively fine condition in which there are only a few crevices and those small ones.

Another object of the invention is the provision of a device of this character in which the disks are arranged in pairs so as to not only break up the soil but throw the soil properly on to the seeds dropped by the planting mechanism, depending shoes being provided which are equipped with means for raising them into inoperative position when the machine is simply drawn from place to place.

An additional object is the provision of a device of this character which will be simple and inexpensive in manufacture, easy to use and adjust, positive in action, efficient and durable in service, and a general improvement in the art.

With the above and other objects and advantages in view, the invention consists in the details of construction and arrangement of parts to be hereinafter more fully described and claimed, and illustrated in the accompanying drawings, in which:—

Figure 2 is a section on the line 2—2 of Figure 1.

Figure 3 is a detail cross-section on substantially the line 3—3 of Figure 2.

Figure 4 is a fragmentary plan view of the seed change support and sprocket.

Figure 5 is a plan view of the chain.

Figure 1:
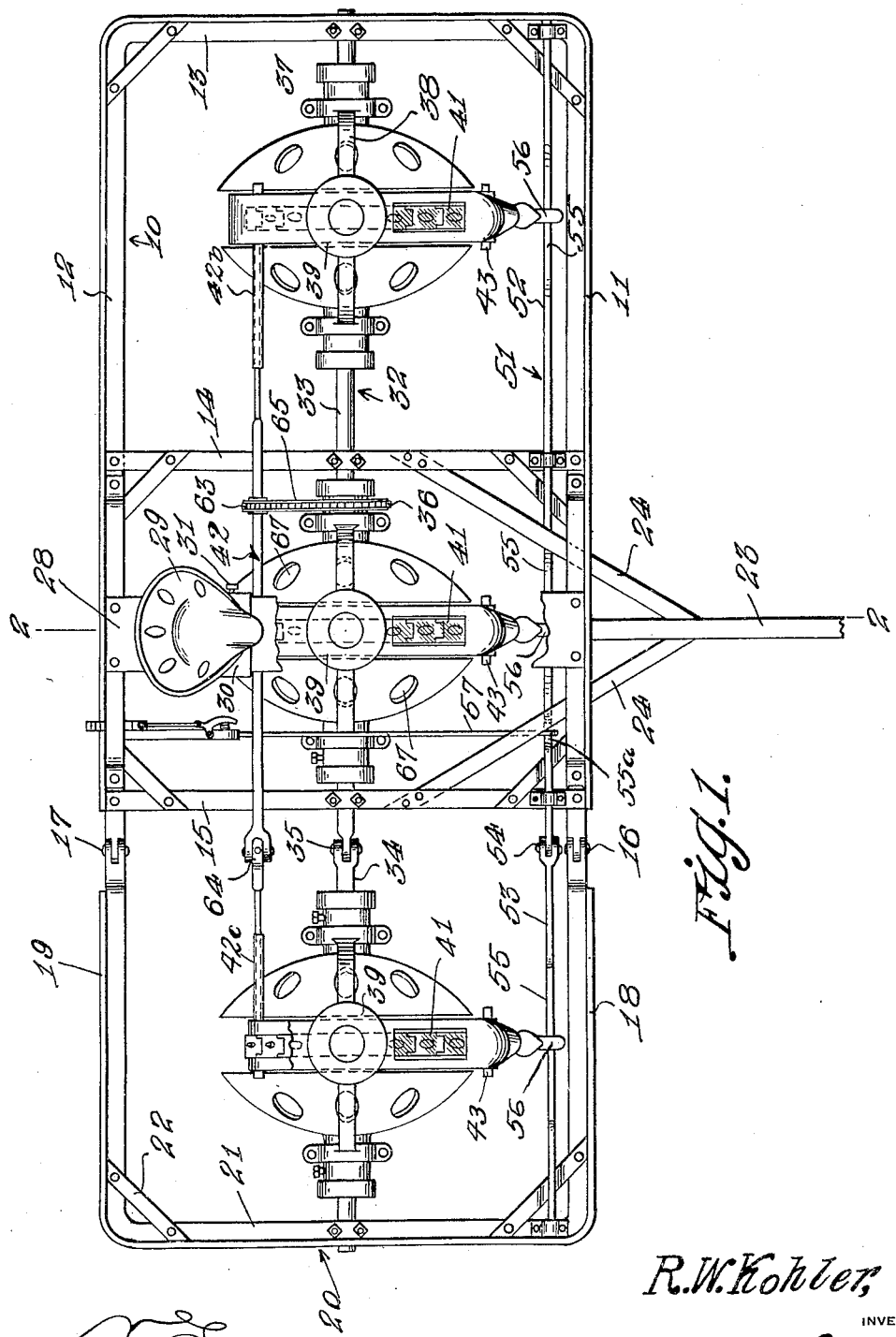
Figure 1 is a plan view of the device illustrating the seed dropping feature.

Referring more particularly to the drawings, I have shown my device as comprising a rectangular frame 10 which may be constructed of suitable angle bars or the like though naturally there is no particular limitation in this respect. This main frame is represented as including forward and rear longitudinal bars 11 and 12, connected by an end bar 13 and additionally connected by spaced transverse bars 14 and 15. The bars 11 and 12 project beyond the cross-bar 15 and pivoted thereto as shown at 16 and 17 are the forward and rear bars 18 and 19 of a movable frame 20 which further includes an end bar 21. At the corners where the various above described bars meet, it may be preferable to provide diagonal braces 22 secured in some suitable manner.

A suitable draw tongue 23 is provided with which are connected braces 24 secured to the cross bars 14 and 15. Secured to the bars 11 and 12 is an arch member 28 which extends from front to rear and upon which is mounted a seat 29 adjustable by virtue of the provision of a slide 30 thereon movably mounted along the arch and adapted to be held at any selected position by means of a set screw 31 or the like.

Journaled longitudinally within both frame members 10 and 20 is a shaft 32 formed of two sections 33 and 34 connected by a pivot or universal joint 35 and carrying a sprocket 36. On this shaft are pairs of bearings 37 with the bearings of each pair connected by an arch member 38 on which is mounted a seed hopper 39 having an open bottom or at least provided with a slot in its bottom portion. Carried by each arch member is a casing 40 having a transparent window 41 therein. Journaled transversely of each casing are shafts 42 and 43 carrying sprockets 44 and 45, respectively. Trained about these sprockets 44 and 45 are chains 46 each of which consists of a plurality of links 47 constituting seed buckets. Beneath each chain is a guide plate or board 49 operating to close the bottoms of the buckets or holes 48 whereby the seeds will not drop out. These chains pass through the lower portions of the hoppers 39 and by looking through the windows 41 the operator may ascertain whether or not the chains are carrying seeds as they should.

Carried by each casing 40 is a planting boot or shoe 50 into which the seeds dragged forwardly by the chains 46 will drop. Journaled longitudinally of the frames 10 and 20 is a rock shaft 51 formed of sections 52 and 53 connected by a universal joint 54. This rock shaft is formed with crank portions 55 and 55$^a$, the former corresponding in number to the planting shoes and being located near the same, and the latter being adjacent the cross bar 15. Pivoted upon this crank portion 55$^a$ is a link 57 which extends rearwardly and which is pivotally connected at 58 with a lever 59 suitably pivoted on the frame and equipped with a grip released latch 60 movable over and cooperating with a notched segment 61 on the frame. Engaged on each crank portion 55 is a link 56 pivotally connected with the adjacent boot or shoe 50. Each guide 49 is carried by a bracket 73$^a$ rotatable with respect to and upon the shaft 32, and connected with this bracket is a brace link 73 in turn connected with the corresponding shoe 50 for the purpose of holding the latter rigid with respect to the seed planting assembly. It will be seen that the parts 39 to 50, 73 and 73$^a$ constitute an assembly which by virtue of the rotatability of the bracket 73$^a$ with respect to the shaft 32 may be tilted or swung to a limited extent about the shaft 32 as an axis. This movement is accomplished by moving the lever 59 forwardly or rearwardly as the case may be, the movement of the lever being communicated through the link 57 to the sectional shaft 51 so that by virtue of the crank portions 55 and links 56 all of the planting assemblies or units will be moved simultaneously. The purpose is to effect variation in the depth of penetration of the shoe members, or to effect elevation thereof into inoperative position when the machine is being moved from place to place.

The shaft 42 is formed of a plurality of sections 42$^a$, 42$^b$ and 42$^c$, the first and last named being connected by a universal joint 64. The sections 42$^b$ and 42$^c$ are telescopic. The purpose in providing this universal joint 64 and also the universal joints 35 and 54, all of which aline with one another and with the pivots 16 and 17 which connect the frame members, is to permit movement of one frame member with respect to the other, as when the machine passes over uneven ground, without interfering with the driving action. It might be mentioned in passing that the shafts 43 are short and need not extend along the whole machine as does the shaft 42. The shaft section 42$^a$ carries a sprocket 63 engaged by a chain 65 which is in turn trained about the sprocket 36 mounted on the shaft 32 as above described. By this means all of the seed dropping chains will be driven.

Carried by the axle 32 are pairs of disks 66 which are preferably formed with openings 67 which will assist in breaking up the ground and permit broken up earth to drop back more readily onto the surface. These disks are concavo-convex in shape and are arranged with their concave sides toward each other. The disks have hub portions 68 through which extend sleeves 69 at the outer ends of which are caps 70 carrying packing 71. The disks are held by set screws 72 which pass through their hubs and through the sleeves 69 which engage against the saft or axle 32. The disks are of course provided for the purpose of not only breaking up and pulverizing the ground but also covering the seeds dropped through the boots or shoes 50.

From the foregoing description and a study of the drawings it will be apparent that I have thus provided a simple and easily operated and controlled device for the purposes specified which will be unusually efficient regardless of whether it be employed only for breaking up ground or whether it be used as a planter. Actual practice has demonstrated that soil cultivated by means of this machine is free from the large cracks and crevices which are generally present and in this way the moisture in the soil is conserved.

While I have shown and described the preferred form of the invention, it is of course to be understood that I reserve the right to make such changes in the form, construction and arrangement of parts as will not depart from the spirit of the invention or the scope of the subjoined claims.

Having described the invention, I claim:

1. In a planting machine, a frame equipped with draft means, an axle journaled through the frame, a pair of disks mounted on said axle, a support rotatable upon the axle between each pair of disks, a casing carried by each support and located above the adjacent disks, a seed hopper at the top of each casing, a pair of shafts journaled through and common to all the casings and carrying sprockets located within each casing, means connected with the axle for positively driving one of said shafts, a recessed seed feeding chain in each casing and trained about the sprockets and moving between the support and the hopper for carrying the seed to one end of the casing, a planting tube depending from said end of each casing, and means connected with the planting tubes for simultaneously tilting all of the supports for raising and lowering the planting tubes.

2. In a planting machine, a frame equipped with draft means, an axle journaled through the frame, a pair of disks mounted on said axle, a support rotatable upon the axle between each pair of disks, a casing carried by each support and located above the adjacent disks, a seed hopper at the top of each casing, a pair of shafts journaled through and common to all the casings and carrying sprockets located within each casing, means connected with the axle for positively driving one of said shafts, a recessed seed feeding chain in each casing and trained about the sprockets and moving between the support and the hopper for carrying the seed to one end of the casing, a planting tube depending from said end of each casing, a horizontal rock shaft mounted in the frame and provided with a plurality of crank portions, links pivotally connected with certain of said crank portions and with the adjacent planting tubes, and a lever operated rod connected with another of said crank portions for raising and lowering the planting tubes.

In testimony whereof I affix my signature.

ROBERT W. KOHLER.